S. L. GOLDMAN.
PASTEURIZING APPARATUS.
APPLICATION FILED JAN. 13, 1916.

1,181,132.

Patented May 2, 1916.
2 SHEETS—SHEET 1.

Fig. 1.

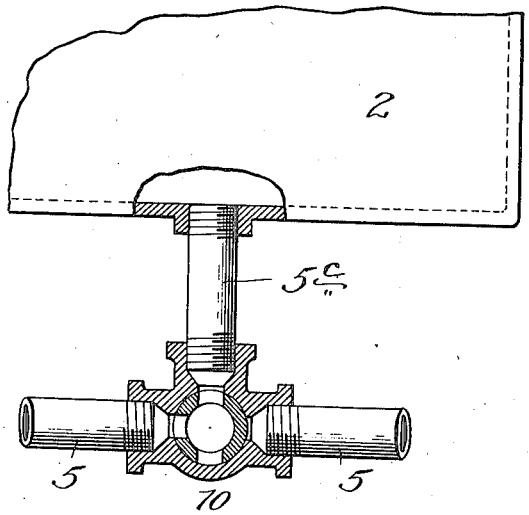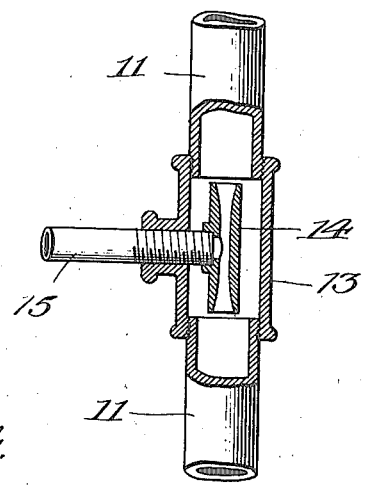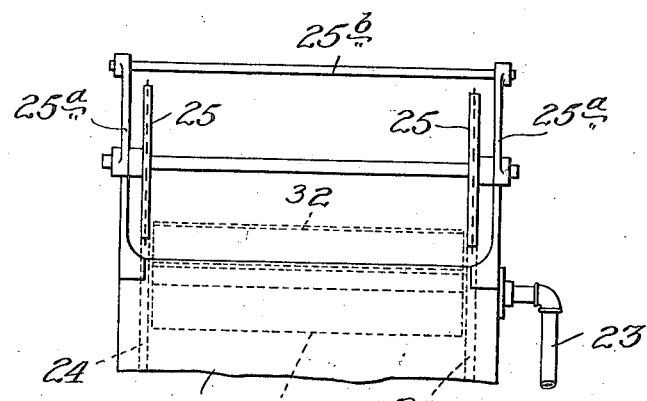

UNITED STATES PATENT OFFICE.

SIGMUND L. GOLDMAN, OF CHICAGO, ILLINOIS, ASSIGNOR TO BARRY-WEHMILLER MACHINERY COMPANY, OF ST. LOUIS, MISSOURI, A CORPORATION OF MISSOURI.

PASTEURIZING APPARATUS.

1,181,132.        Specification of Letters Patent.        Patented May 2, 1916.

Application filed January 13, 1916. Serial No. 71,896.

*To all whom it may concern:*

Be it known that I, SIGMUND L. GOLDMAN, a citizen of the United States, residing at Chicago, in the county of Cook and State of Illinois, have invented a new and useful Improvement in Pasteurizing Apparatus, of which the following is a specification.

My invention relates to an improvement in the type of pasteurizing apparatus in which the product (bottled or canned) to be pasteurized is conveyed through a succession of respectively attemperating, pasteurizing and cooling compartments.

The primary objects of my invention are to provide an improved system of circulating the liquid in the compartments, whereby its different appropriate temperatures therein may be regulated to a nicety to produce the maximum output of the apparatus in the minimum of space and time, and with the employment of a comparatively small quantity of steam for heating the liquid; and to effect comparatively quick heating of the product to be pasteurized and rapid and positive cooling of the same after its pasteurization, to cause the product, and especially beer, to emerge from the apparatus at the right temperature for handling the bottles, and particularly for labeling them.

In the accompanying drawings, Figure 1 shows the preferred construction of my improved apparatus by a view in side elevation, diagrammatic in character; Fig. 2 is a broken view, on a scale enlarged over that observed in Fig. 1, showing in section one of the three similar three-way valves in the feed and discharge pipe for the pasteurizing liquid; Fig. 3 is a broken view, also enlarged, showing in section a priming-head device, and Fig. 4 is a broken view showing the upper part of the left-hand end of the apparatus as represented in Fig. 1, in elevation.

The tank 1 comprises a series of compartments, 2, 3 and 4, affording, respectively, the attemperating, the pasteurizing and the cooling compartments. The compartments 2 and 3 are partially divided from each other, as by intervening air-spaced partitions at $3^a$, above which those two compartments are in open communication; and air-spaced partitions at $3^b$, extending from the bottom of the tank beyond the normal water-level, at $x$, separate the pasteurizing and cooling compartments against inter-circulating communication except through a valved pipe-connection $3^c$ bridging the air-space $3^b$ and provided as and for the purpose hereinafter described. The compartments 2 and 4 are each subdivided, respectively by air-spaced partitions at $2^a$ and $4^a$ depending from the top short of the bottom of the tank to afford open communication between the members of each pair of sub-compartments or legs below the partitions, and permit each leg to hold a different temperature of the pasteurizing medium.

The tank 1 is shown to be supported at its bottom in raised position. For filling the tank with water, and emptying it, a straight-line pipe 5 is provided to extend lengthwise along the tank, near one end of which it contains a shut-off valve 6 and near the opposite end a similar valve 7. A branch $5^a$ containing a three-way valve 8 leads from the pipe 5 through the lower part of the tank into the compartment 4 near its lower left-hand corner; a branch $5^b$ containing a three-way valve 9 leads similarly into the compartment 3 near its lower right-hand corner, and a branch $5^c$, containing a three-way valve 10, leads similarly into the compartment 2 near its lower inner corner. These three-way valves are each of the construction of that illustrated in Fig. 2.

A pipe 11 leads, outside the tank, from the upper part of the inner leg of compartment 2 into a horizontal pipe 12 having two depending branches, $12^a$ and $12^b$, leading into the lower part of the pasteurizing compartment 3. The pipe 11 contains, in its vertical section, a T-coupling 13, within which extends a relatively narrow vertical and flaringly open-ended tubular head 14 on the end of a pipe 15, of relatively small diameter, containing a valve $15^a$ and projecting into the coupling 13, to carry the head therein, from a header 16 extending along and communicating at intervals with the lower outer-corner portion of the compartment 2.

A steam-supply pipe 17 leads into a jet-pump device 18 connecting the pipes 11 and 12 and controlled by a thermostat 19 having its expansible-fluid containing member 20 projecting into the compartment 3 near its bottom. The jet-pump and thermostat devices are preferably those of United States Letters Patent No. 907,639, dated December 22, 1908, wherein the jet-pump device is denoted, as a whole, by the reference-numeral 108, and the thermostat by the reference-numeral 127.

A valved fresh-water spray-pipe 21 discharges into the end sub-compartment of the compartment 4 through its top, adjacent to which that sub-compartment is provided with an overflow $22_1$ for maintaining the water-level normally at $x$; though if that overflow should become clogged, causing a rise of the water-level to $x^1$, the excess water will run out through an overflow 23 provided in the upper part of the first leg of compartment 2.

For conveying the product to be treated through the pasteurizer, parallel endless chains 24 pass about suitably disposed pairs of sprockets, indicated at 25, 26, 27, 28 and 29, and at 30, the last-named reference-numeral indicating each of a plurality of relatively smaller sprockets; and all sprockets are driven from the sprocket 28. The sprockets at both sides of the tank for the parallel-chain conveyer 24 are preferably journaled on stub-shafts, except the sprockets 29, which are on the opposite-end portions of a shaft $29^a$ supported in the tank-walls to extend through the lower part of the compartment 3. Holders or "baskets" 31, of any desired kind, hung at intervals, as usual, on the conveyer, for carrying the bottles, cans or other receptacles containing the product to be pasteurized, to be conveyed through the apparatus, are preferably provided with hinged lid-sections 32, to be raised for introducing and withdrawing the receptacles. Since these lid-sections are liable to be left open after raising them, and should be closed while the holders are passing through the apparatus, I connect the opposite standards $25^a$, carrying the sprockets 25 at the admission-end of the tank 1, by a rod $25^b$ to extend into the path of the lids 32 when raised, to cause the latter to encounter the rod in passing it and be turned down and thus closed.

The inner leg of the compartment 2, and the compartment 3 and inner leg of the compartment 4 are covered, as shown, to retain the heat in these parts of the apparatus; though the covers should be removable to permit access to the interior of the tank for repair and emergency purposes. Thermometers, indicated at 33, are provided on all compartments and sub-compartments.

For operating the apparatus, the tank 1 is first supplied with water upon opening the valves 6, 8, 9 and 10, and the valve in pipe $3^c$, the valve 7 being closed. When the tank has been filled to the level $x$, which will be manifested at the overflow 22, the valve 6 is closed, as is also the valve 10, while the valves 8 and 9 remain open to permit circulation between the inner leg of compartment 4 and the compartment 3, thereby to prevent the occurrence of cool strata of the pasteurizing liquid in the adjacent lower corner-portions during the operation of the apparatus. Steam is then turned on at the pipe 17 to course through the jet-pump 18, pipe 12 and its branches $12^a$ and $12^b$, and enter the compartment 3 for heating the water therein, and to a lesser extent than in the inner leg of compartment 2. While this is proceeding, the shut-off valve $15^a$ in pipe 15 remains closed, but that in pipe $3^c$ remains open to cause circulation between the tank-sections it connects to tend to equalize the temperature of the upper stratum of the water in them, until that in compartment 3 has reached the pasteurizing temperature (about 48° R.), when that valve is closed. The thermostat shuts off the steam-supply while that temperature continues, and acts to raise it wherever it falls below.

The steam, in its passage through the jet-pump 18, exerts an injector-action on the pipe 11 to draw water from the inner leg of compartment 2 and circulate it between compartment 3 and that leg for attempering, by stirring, the water in the latter. When the predetermined conditions of temperature have been thus attained, the conveyer is started. The holders 31 enter in succession the compartment 2 at its top and pass through the series of compartments and sub-compartments in the tank. As a holder enters the tank, the volume of water it displaces passes through the pipe $3^c$, carrying heat with it to warm the upper portion of the water in the inner leg of compartment 4, which overflows at 22. In the meantime, the heat of the water in compartment 3 slowly attains the inner leg of compartment 2 and meets therein the ascending holders 31 containing the cold receptacles, which attemperate the water in that leg by cooling it, so that gradual warming and preliminary heating of the contents of the receptacles ensue. When the first product under treatment approaches the sprockets 27, the valve in pipe $3^c$ is turned to close the latter; and thereupon the valve in the spray-pipe 21 is opened to clean the holders and their contents and admit cold hydrant-water, in proper quantity, into compartment 4, for regulating the temperature of the water in the latter, which should, in the upper part, be about that of the surrounding atmosphere. All communication has now been cut off between the compartments 3 and 4, except through the valves 8 and 9, which remain open for continuing the circulation, to tend to equalize the temperature in the adjacent lower parts of these compartments, besides preventing cold spots, or strata, in their respective adjacent corner-portions.

The valve 15ᵃ is now opened to the extent required. The ejector-action of the jet-pump, in drawing water from the upper part of the inner leg of compartment 2 into the lower part of compartment 3, causes the water, in passing through the coupling 13 and priming-head 14 therein, to suck a certain amount of water from the lower outer corner-portion of compartment 2 through pipe 15 into the pipe 11 to mix therein with the water from the inner leg of that compartment and be heated by the steam being injected into the bottom of compartment 3 through the branches 12ᵃ and 12ᵇ. This action enhances the circulation and the mixing in the inner leg of compartment 2 and in compartment 3 of the pasteurizing medium; and it also avoids dead spots, or cold strata of the water in the lower outer corner-portion of compartment 2, where they would otherwise occur and impair the operation of the apparatus. For this purpose the valve 15ᵃ is only slightly opened. Opening it more or less fully causes more water to flow from compartment 2 and be heated for prolonging accordingly the pasteurizing operation while maintaining the same speed of the conveyer.

The amount of the water carried through the pipe 15 and priming-head may be easily regulated through the medium of the valve 15ᵃ. The priming-head 14 creates an initial suction through the small pipe 15 into the large pipe 11 and the use of such head is essential in view of the fact that the suction point in the attemperating compartment is lower than the point at which the pipe 15 delivers into the large pipe 11, and by the use of such primer the necessity of a pump or additional ejector is obviated. A further advantage of the priming head is that the same maintains a flow of water of equal velocity at all times when the valve 15ᵃ is open. The water in the inner leg of compartment 2 is only heated from the adjacent part of the tank 3, and is cooled by the incoming product in the traveling holders 31. In this way a comparatively large volume of the pasteurizing medium is continuously maintained at the pasteurizing temperature and under circulation without the employment of any pumps, such as are ordinarily used for the purpose, but merely by a thermostat-controlled jet-device or injector, thereby saving about 50 per cent. in steam consumption and greatly augmenting (to the extent of about 30 per cent.) the capacity of the apparatus.

When, toward the end of a run, the last holder 31 has been brought between the sprockets 27, valve 8 is closed to keep the heat in the pasteurizing medium for the next day's run, the steam is turned off, and valve 21 should be closed about half-way until the product has all emerged from the tank. With the valve 6 closed the tank may be emptied by opening all of the other valves in pipe 5.

I realize that considerable variation is possible in the details of construction thus specifically shown and described, and I do not intend by illustrating a single, specific or preferred embodiment of my invention to be limited thereto; my intention being in the following claims to claim protection upon all the novelty there may be in my invention as fully as the state of the art will permit.

What I claim as new and desire to secure by Letters Patent is:—

1. A pasteurizing apparatus comprising a series of compartments including attemperating and pasteurizing compartments, a simultaneously acting single-ejector and thermostat-actuated heating and circulating line for establishing communicating between said attemperating and pasteurizing compartments, and an auxiliary controllable line leading from the attemperating compartment and connected with said first line and actuated and controlled by the ejector and thermostat actuating and controlling said first line, whereby to regulate the period of pasteurization and the capacity of the apparatus.

2. A pasteurizing apparatus comprising a tank containing communicating pipe connected attemperating pasteurizing compartments and a normally non-communicating cooling compartment, and equipped with an endless holder-carrying conveyer for carrying the product to be treated through said compartments, and a thermostat-controlled steam-jet connected and coöperating with said intercommunicating pipe to withdraw the pasteurizing medium from the attemperating compartment and heat it in its course to and deliver it directly into the pasteurizing compartment while maintaining predetermined temperatures of said medium in both compartments.

3. A pasteurizing apparatus comprising a tank containing attemperating and pasteurizing compartments and a cooling compartment, and equipped with an endless holder-carrying conveyer for carrying the product to be treated through said compartments, a pipe of relatively large diameter connecting the attemperating and pasteurizing compartments outside the tank, a thermostat-controlled steam-jet connected with said pipe to heat, withdraw from the attemperating compartment, deliver and circulate the liquid pasteurizing medium, and a valved pipe of relatively small diameter leading from the attemperating compartment into said larger pipe.

4. A pasteurizing apparatus comprising a tank containing attemperating and pasteurizing compartments and a cooling compartment and equipped with an endless holder-carrying conveyer, for carrying the product to be treated through said compartments, a pipe of relatively large diameter connecting the upper part of the attemperating compartment with the lower part of the pasteurizing compartment, a thermostat-controlled steam-jet connected with said pipe near its lower end to heat, withdraw from the attemperating compartment, deliver and circulate the liquid pasteurizing medium, a pipe of relatively-small diameter leading from the lower outer portion of the attemperating compartment into said larger pipe and provided in the latter with a priming-head in the path of said medium coursing through said larger pipe, and a valve in said smaller pipe for controlling the flow through it.

5. A pasteurizing apparatus comprising a tank containing attemperating and pasteurizing compartments and a cooling compartment partitioned from said pasteurizing compartment to be normally out of circulating communication with the two first-named compartments, an endless holder-carrying conveyer for carrying the product to be treated through said compartments, a valved pipe connecting the cooling and pasteurizing compartments, a pipe of relatively large diameter connecting the attemperating and pasteurizing compartments, a thermostat-controlling steam-jet connected with said pipe to heat, withdraw from the attemperating compartment, deliver and circulate the liquid pasteurizing medium, and a pipe of relatively small diameter leading from the attemperating compartment into said larger pipe.

6. A pasteurizing apparatus comprising a tank containing attemperating and pasteurizing compartments and a cooling compartment partitioned from said pasteurizing compartment to be normally out of circulating communication with the two first-named compartments, an endless holder-carrying conveyer for carrying the product to be treated through said compartments, a valved pipe connecting the cooling and pasteurizing compartments, a pipe of relatively large diameter connecting the attemperating and pasteurizing compartments, a thermostat-controlled steam-jet connected with said pipe to heat, withdraw from the attemperating compartment, deliver and circulate the liquid pasteurizing medium, and a valved pipe of relatively small diameter leading from the lower part of the attemperating compartment into said larger pipe and provided in the latter with a priming head in the path of said medium coursing through said larger pipe.

7. A pasteurizing apparatus comprising a tank containing a subdivided attemperating compartment, a pasteurizing compartment and a subdivided cooling compartment partitioned from said pasteurizing compartment to be normally out of circulating communication with the two first-named compartments, an endless holder-carrying conveyer for carrying the product to be treated through said compartments, a pipe connecting the inner leg of the attemperating compartment with the lower part of the pasteurizing compartment, and a thermostat-controlled steam-jet connected with said pipe toward its lower end to heat, withdraw from the attemperating compartment, deliver to the pasteurizing compartment and circulate the liquid pasteurizing medium.

8. A pasteurizing apparatus comprising a tank containing attemperating and pasteurizing compartments and a cooling compartment, and equipped with an endless holder-carrying conveyer for carrying the product to be treated through said compartments, a pipe of relatively larger diameter extending outside the tank from the upper inner part of the attemperating compartment to the lower part of the pasteurizing compartment and terminating in a transverse section provided with depending branches leading into said lower part, a thermostat-controlling steam-jet connected with said pipe and transverse section to heat, withdraw from the attemperating compartment, deliver to the pasteurizing compartment and circulate the liquid pasteurizing medium, and a pipe of relatively small diameter leading from the lower outer part of the attemperating compartment into said larger pipe above the junction therewith of the steam-jet and provided in said larger pipe with a priming head.

SIGMUND L. GOLDMAN

In presence of—
A. C. FISCHER,
K. O'NEILL.